United States Patent [19]
Denley

[11] Patent Number: 5,697,161
[45] Date of Patent: *Dec. 16, 1997

[54] LEVEL INDICATING DEVICE FOR A VEHICLE HEADLAMP

[75] Inventor: Ronald S. Denley, Woodstock, Ill.

[73] Assignee: Elco Textron Inc., Rockford, Ill.

[*] Notice: The term of this patent shall not extend beyond the expiration date of Pat. No. 5,467,255.

[21] Appl. No.: 558,027

[22] Filed: Nov. 13, 1995

Related U.S. Application Data

[63] Continuation-in-part of Ser. No. 225,649, Apr. 11, 1994, Pat. No. 5,467,255.
[51] Int. Cl.⁶ .................... G01B 5/24; B60Q 1/04
[52] U.S. Cl. .................. 33/288; 33/370; 33/335; 362/66
[58] Field of Search .............. 33/288, 372, 384, 33/390, 264, 335, 370; 362/66, 80, 61, 101, 287, 418, 427

[56] References Cited

U.S. PATENT DOCUMENTS

| | | | |
|---|---|---|---|
| 5,467,255 | 11/1995 | Denley | 33/288 |
| 5,479,714 | 1/1996 | Hopkins | 33/288 |

*Primary Examiner*—Christopher W. Fulton
*Attorney, Agent, or Firm*—Leydig, Voit & Mayer, Ltd.

[57] ABSTRACT

The indicating device is adapted to be installed on a platform on a headlamp frame with a slip fit and, once installed, is automatically locked into place. The indicating device includes a bubble level having a vial which is molded integrally with a base adapted to be assembled with a spring metal retaining bracket with a slip fit. The retaining bracket includes cantilevered legs with free end portions which resiliently engage the upper side of the base to enable an adjusting screw to tilt the vial upwardly and downwardly to various positions relative to horizontal.

8 Claims, 7 Drawing Sheets

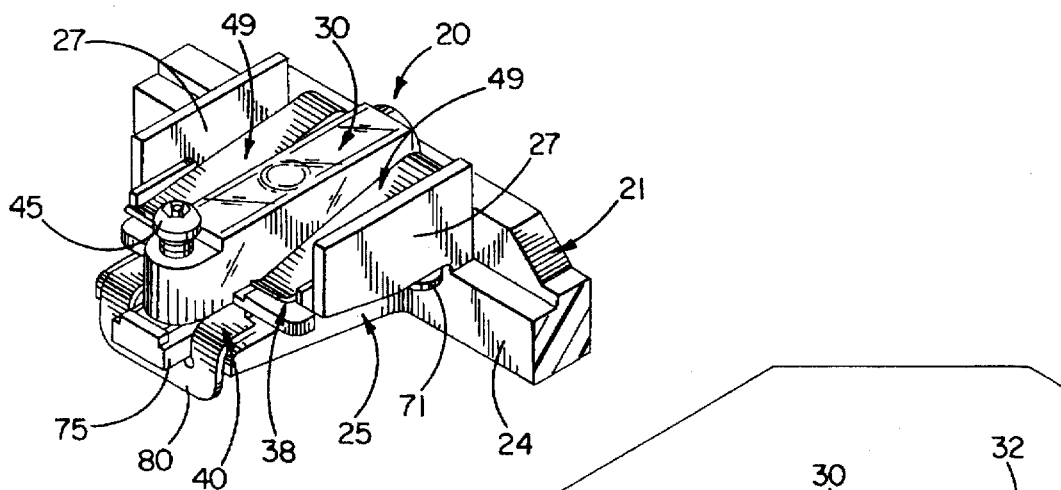
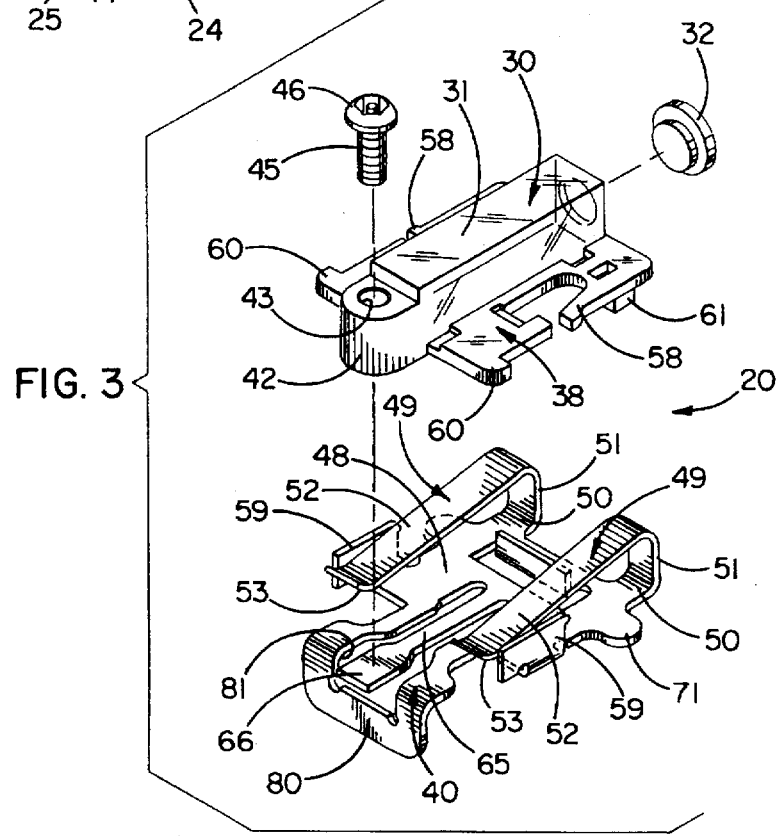
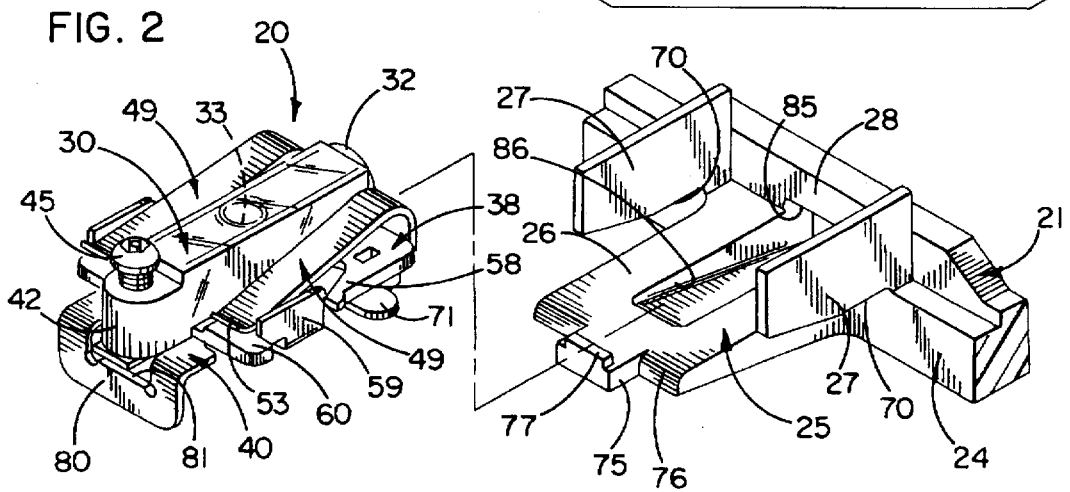
FIG. 1
FIG. 3
FIG. 2

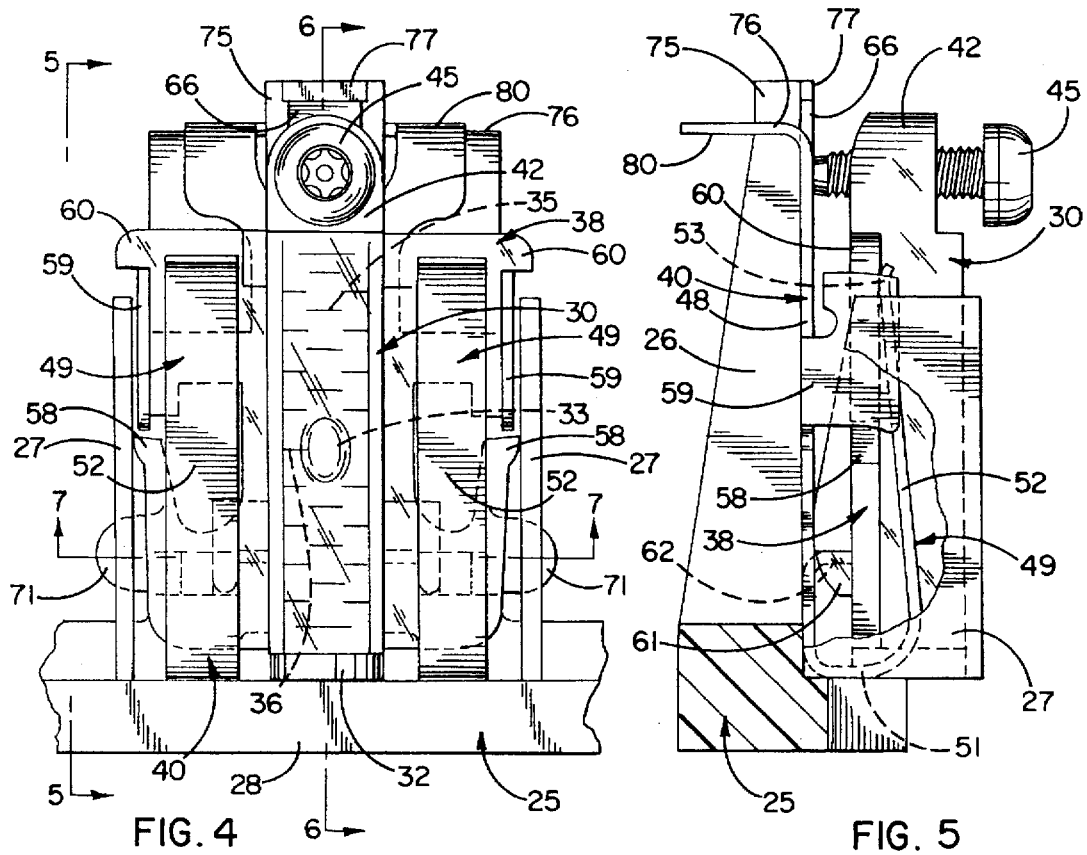
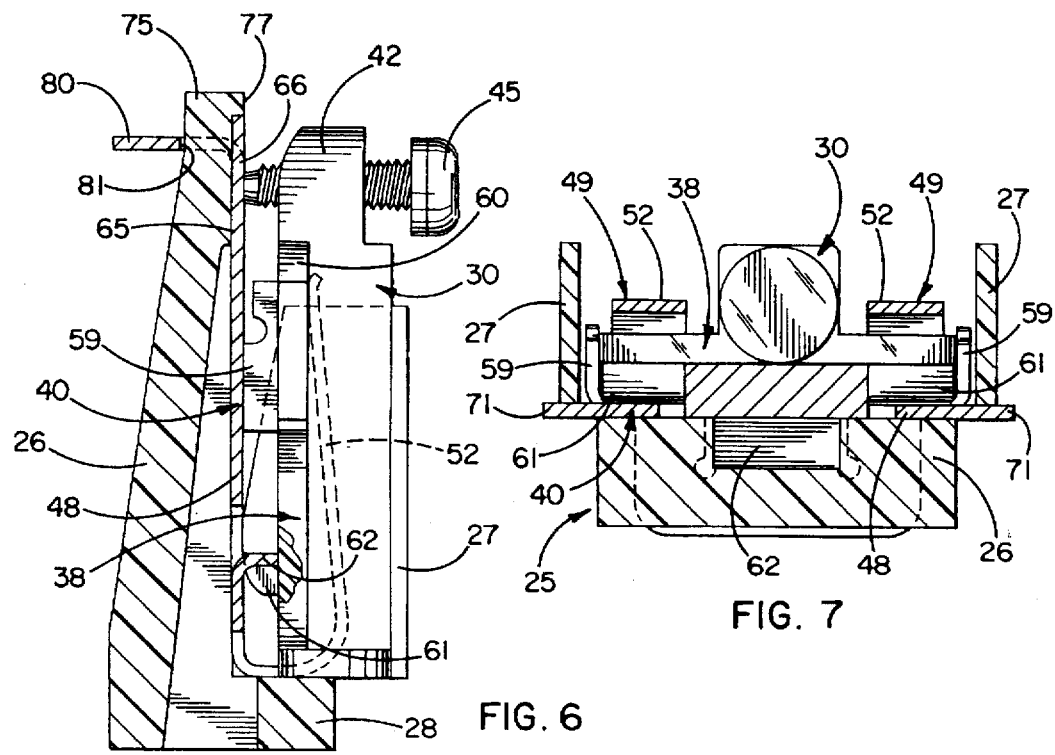

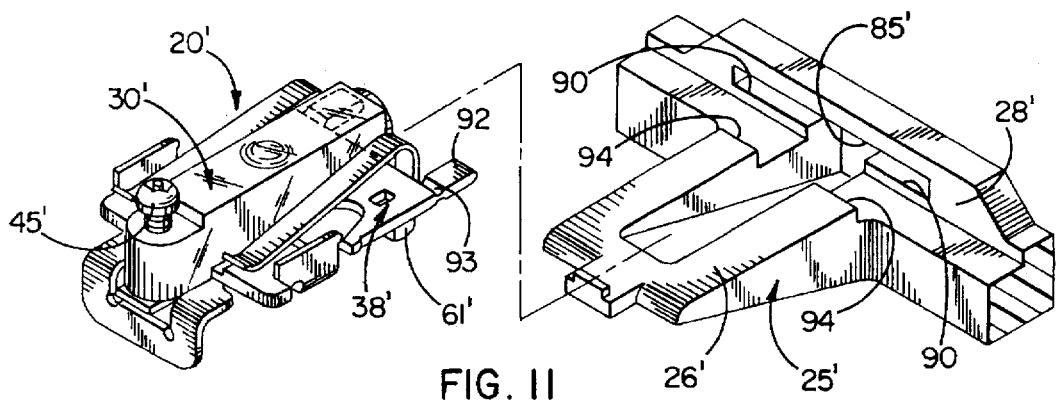
FIG. 11
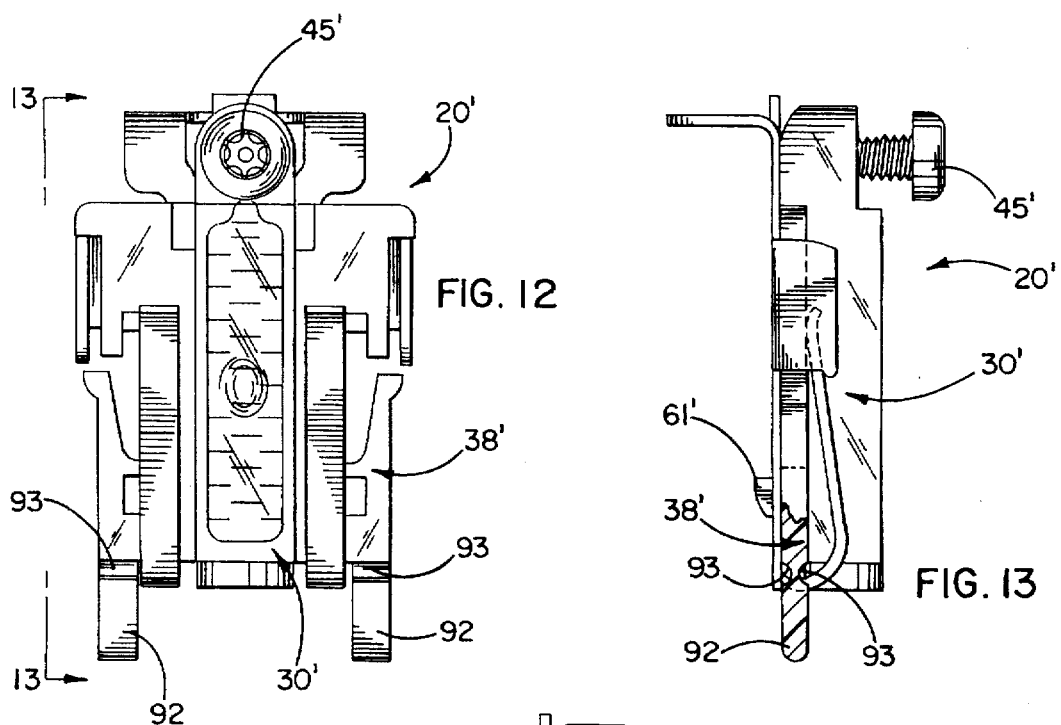
FIG. 12
FIG. 13
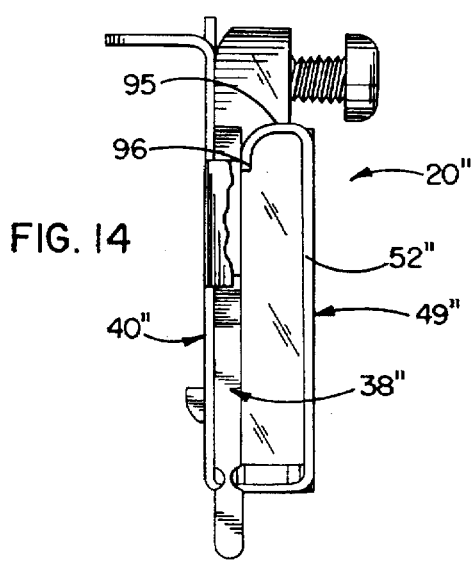
FIG. 14

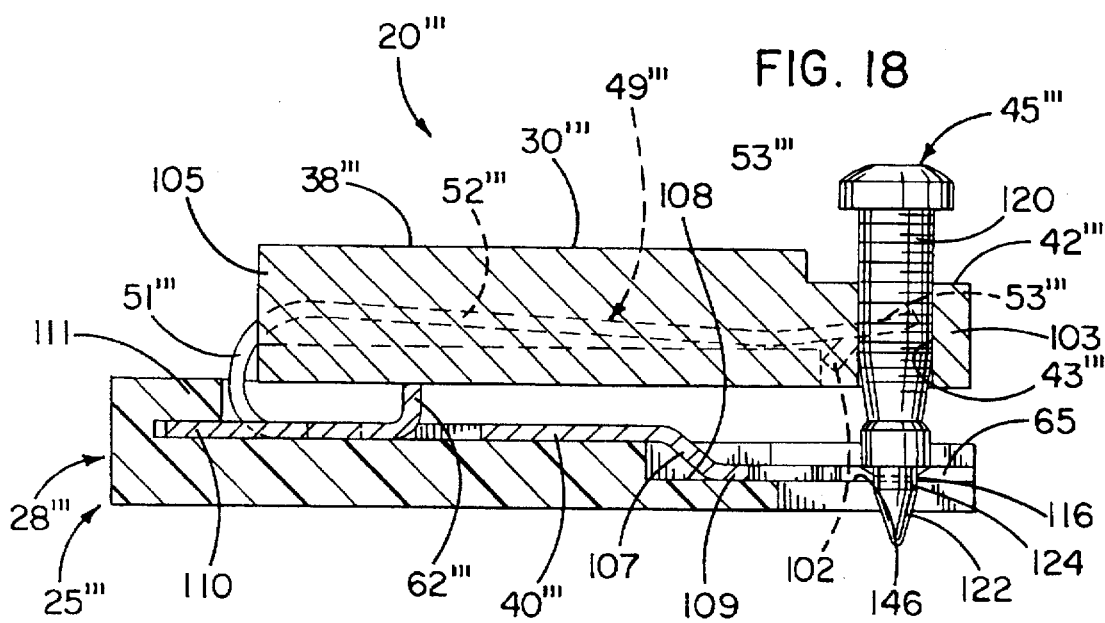
FIG. 18
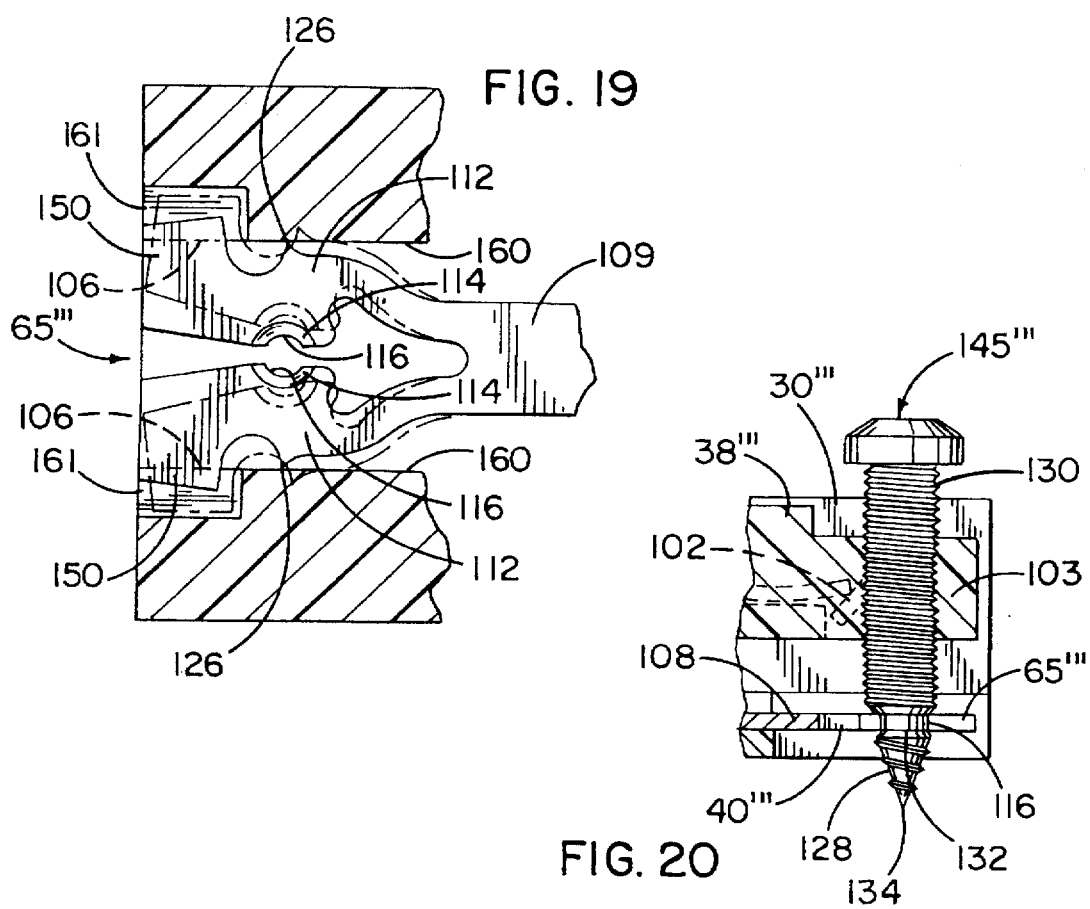
FIG. 19
FIG. 20

LEVEL INDICATING DEVICE FOR A VEHICLE HEADLAMP

This is a continuation-in-part application of U.S. application Ser. No. 08/225,649, filed on Apr. 11, 1994, issued Nov. 14, 1995 as U.S. Pat. No. 5,467,255.

BACKGROUND OF THE INVENTION

This invention relates to a device for indicating the degree of tilt of a vehicle headlamp beam and, more specifically, to a device having a bubble level formed by a liquid-filled vial with a gas bubble therein that coacts with a graduated scale to indicate the degree of tilt of the vial from horizontal.

Such an indicating device typically is mounted on the frame or other component of the headlamp assembly. At the vehicle assembly plant, the frame is tilted about a horizontal axis to establish proper aim of the headlamp beam in a vertical direction. Once this is achieved, the inclination of the vial is adjusted in order to "zero" the bubble and establish the preset position of the headlamp. If the headlamp subsequently becomes improperly aimed, the indicating device may be used to determine when the lamp has been adjusted back to the preset position.

Commonly assigned Denley U.S. application Ser. No. 08/085,650, filed Jun. 30, 1993, issued Apr. 18, 1995, as U.S. Pat. No. 5,408,391, discloses a comparatively small and low cost indicating device in which the vial is molded integrally with a base adapted to be assembled in a relatively simple manner with a spring metal retaining bracket by virtue of a slip fit between the base and the bracket. The device is installed with a slip fit into a molded housing or platform on the frame of the headlamp. When so installed, cantilevered legs of the bracket bear resiliently against laterally spaced upper walls of the housing to help retain the device in assembled relation with the housing. By virtue of resiliently engaging the upper walls of the housing, the legs enable the use of an adjusting screw for changing the inclination of the vial. Because the spring legs must resiliently engage the upper walls of the housing in order to enable adjustment of the vial, the device is more or less limited in use to a specific type of housing.

SUMMARY OF THE INVENTION

The general aim of the present invention is to provide a new and improved indicating device of the above general type which better lends itself to use with a wider variety of mounting housings or platforms.

A more specific object of the invention is to achieve the foregoing by providing an indicating device having a mounting bracket with spring legs which effectively coact with an adjusting screw without need of the legs resiliently engaging a mounting housing or platform.

In even a more detailed sense, the invention resides in the provision of an indicating device in which the spring legs are resiliently loaded by the plastic base of the vial in order to enable the adjusting screw to change the inclination of the vial.

These and other objects and advantages of the invention will become more apparent from the following detailed description when taken in conjunction with the accompanying drawings.

BRIEF DESCRIPTION OF THE DRAWINGS

FIG. 1 is a rear perspective view of a portion of a typical vehicle headlamp frame equipped with a new and improved indicating device incorporating the unique features of the present invention.

FIG. 2 is an exploded perspective view of the indicating device and frame portion shown in FIG. 1.

FIG. 3 is an exploded perspective view of the components of the indicating device.

FIG. 4 is an enlarged top plan view of the indicating device and the headlamp frame.

FIG. 5 is a side elevational view of the indicating device as seen along the line 5—5 of FIG. 4, portions of the headlamp frame being broken away and shown in section.

FIG. 6 is a cross-section taken substantially along the line 6—6 of FIG. 4.

FIG. 7 is a cross-section taken substantially along the line 7—7 of FIG. 4.

FIGS. 11 and 12 are views generally similar to FIGS. 2 and 4, respectively, but show the modified indicating device.

FIG. 13 is a side elevational view of the modified indicating device as seen along the line 13—13 of FIG. 12, portions of the indicating device being broken away and shown in section.

FIG. 14 is a view generally similar to FIG. 13 but shows still another indicating device.

FIG. 18 is a cross-section taken substantially along the line 18—18 of FIG. 17.

FIG. 19 is an enlarged partial plan view showing the interlocking of the bracket and platform upon execution of a barb-set operation;

FIG. 20 is an fragmentary view of FIG. 18 showing an alternative calibrating screw which can be used with the fourth embodiment of the indicating device.

Figure 8:
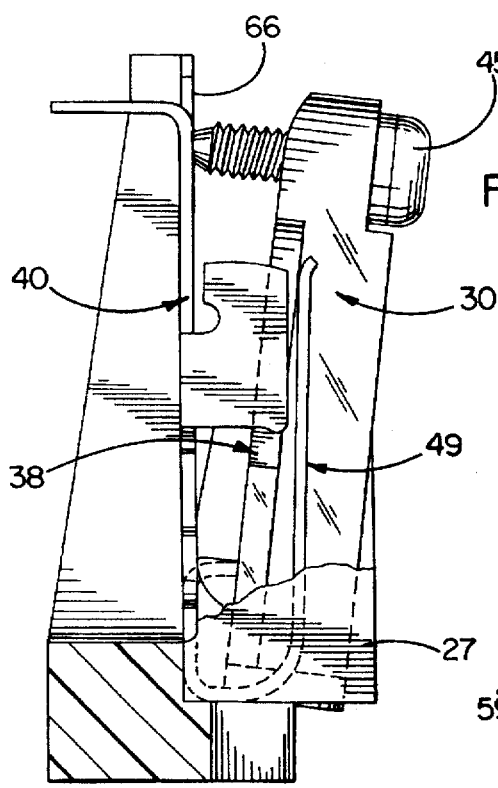
FIG. 8 is an enlarged view of certain components of the indicating device illustrated in FIG. 5 and shows such components in moved positions.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as incorporated in a level indicating device 20 which is associated with a frame 21 for holding a vehicle headlamp (not shown) and for mounting the headlamp on a vehicle body. As is conventional, the headlamp frame is supported on the body to pivot about a horizontal axis and is adapted to be pivoted about such axis by a manually operable adjusting device (not shown) which may, for example, be of the type disclosed in U.S. Pat. No. 5,193,905. During assembly of the vehicle, the frame is tilted as necessary to aim the headlamp properly in the vertical direction. Once the proper aim has been established, the indicating device is "zeroed" in order to establish the proper aim for future reference.

The present headlamp frame 21 is molded of plastic and includes an upper frame member 24 with a housing or platform 25. The platform 25 is shown most clearly in FIG. 2 and basically comprises a flat bottom wall 26, a pair of laterally spaced and upwardly projecting side walls 27, and an upwardly projecting forward wall 28. The various walls 26, 27 and 28 define a pocket within which a substantial portion of the indicating device 20 is located.

The present indicating device 20 includes a bubble level formed in part by a transparent vial 30 having a plastic body portion 31 with a generally rectangular external cross-sectional shape. The vial contains a viscous liquid which is sealed in the body portion of the vial by a generally circular cap 32 made of plastic and ultrasonically welded or otherwise suitably secured with a liquid-tight seal to the forward end of the body portion of the vial. A gas bubble 33 is entrapped in the liquid and, as is typical of bubble levels, moves toward that end of the vial that is tilted upwardly from horizontal. A graduated scale 35 (FIG. 4) underlies the transparent vial 30 and coacts with the vial to indicate the degree of tilt of the vial from horizontal. In this instance, the graduations of the scale 35 are printed on a strip of plastic or similar material which is glued in place by an optically clear adhesive. The graduations include a "zero" mark 36 indicating that the vial is level when the bubble is centered over such mark, and further include various other marks indicative of the degree that the vial is out of level in one direction or the other. The vial has a radius of curvature that lies in the vertical aiming plane of the headlamp beam. The apex of such curvature coincides with the "zero" mark, and the spacing of the graduations is related geometrically to the radius of curvature.

The vial 30 is molded integrally with a base 38 (FIG. 3). A retaining bracket 40 interfits with the base to hold the indicating device in the platform 25 and to facilitate calibration of the indicating device 20.

More specifically, the base 38 is molded as a unit with the vial 30 and is made of a hard but resilient plastic such as transparent nylon. The base includes a center portion immediately underlying the vial and further includes wing portions projecting laterally from the sides of the vial adjacent the bottom thereof. A shallow pocket is molded in the underside of the center portion of the base to serve as a locator for the graduated scale 35.

The base 38 also is formed with a nose 42 (FIG. 3) located at the rear end of the vial 30 and just slightly smaller in height than the vial. A hole 43 is formed vertically through the nose and is adapted to receive the shank of an adjusting or calibrating screw 45 whose head 46 is formed with a tamperproof driving recess requiring a special tool for turning the screw. The screw preferably is of the thread-forming type and cuts threads in the plastic of the hole 43 as an incident to being initially driven into the hole.

The retaining bracket 40 (FIGS. 3 and 9) is made of a single piece of thin spring metal (e.g., spring steel) and includes a generally flat plate 48 which underlies the base 38. In accordance with the present invention, two laterally spaced legs 49 are formed integrally with the forward end of the plate 48. Each leg includes a generally horizontal forwardly extending section 50 (FIGS. 3 and 9) which projects forwardly beyond the forward end of the base 38; an upwardly extending section 51 projecting upwardly from the rear end of the forwardly extending section 50 in forwardly spaced relation with the base; and a rearwardly extending cantilevered upper section 52. In the preferred embodiment shown in FIGS. 1–9, each cantilevered section 52 is spaced above the base 38 adjacent the front thereof and slants downwardly toward the upper side of the base upon progressing rearwardly. The cantilevered sections straddle the vial 30.

Pursuant to the invention, each cantilevered section 52 includes a free end portion which bears resiliently downwardly against the upper side of the base 38 adjacent the rear end thereof. Herein, the free end portion of each cantilevered section engages the upper side of the base and then curves upwardly for a short distance as indicated at 53 in order to avoid digging into the base with a raw edge. Engagement of the free ends 53 of the legs 49 with the base holds the base and the bracket 40 in vertically assembled relation.

Assembly of the bracket 40 with the base 38 is effected by sliding the bracket rearwardly with respect to the base. As the bracket 40 is slid rearwardly relative to the base 38, means automatically interlock with one another to prevent return forward movement of the bracket with respect to the base. Herein, these means comprise two laterally spaced and cantilevered latching fingers 58 (FIG. 3) formed integrally with the side edge portions of the base about midway between its ends and capable of flexing laterally inwardly relative to the base. As the bracket 40 is slid rearwardly relative to the base 38, the rear edges of lugs 59 which are bent upwardly from the side edges of the plate 48 engage the fingers 58 and cam the fingers inwardly. Once the forward edges of the lugs move rearwardly past the fingers, the latter spring outwardly and thereafter engage the forward edges of the lugs to prevent forward movement of the bracket relative to the base. Ears 60 (FIG. 4) are formed integrally with and project laterally from the base adjacent the rear end thereof. Engagement of the rear edges of the lugs 59 with the ears 60 limits the extent to which the bracket may move rearwardly relative to the base 38 and vial 30. The lugs also limit lateral movement of the rear end portion of the base relative to the bracket. Lateral movement of the forward end portion of the base relative to the bracket is limited by virtue of ears 61 (FIGS. 6 and 7) formed integrally with and projecting downwardly from the side edges of the base straddling a tab 62 which is struck upwardly from the plate 48 adjacent the forward end thereof. The upper edge of the tab 62 defines a fulcrum which engages the lower side of the base 38 near the forward end of the base and which supports the base for pivoting relative to the bracket 40 about a laterally extending axis.

Figure 9:
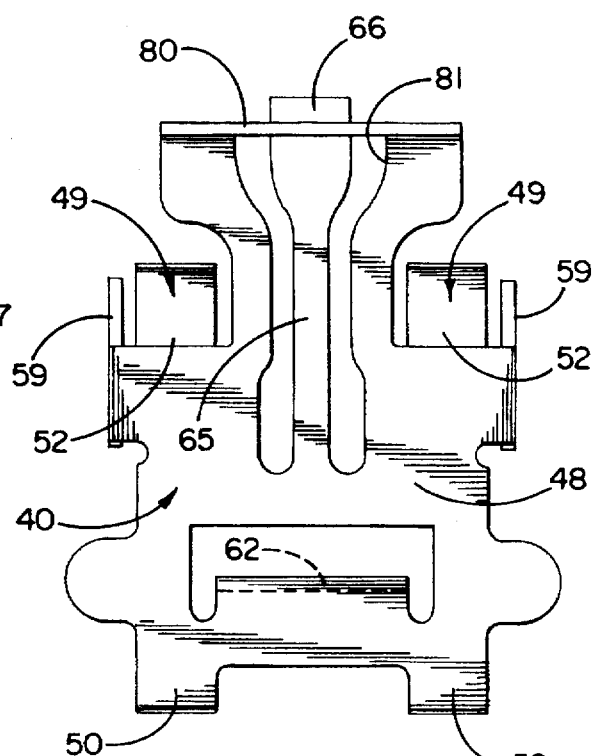
FIG. 9 is a bottom plan view of the retaining bracket of the indicating device.
Figure 10:
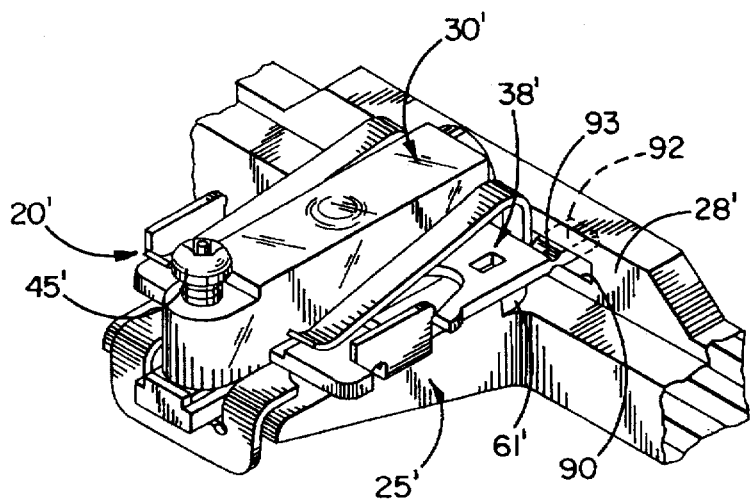
FIG. 10 is a view generally similar to FIG. 1 but is a front perspective showing a modified indicating device in connection with a different type of headlamp frame.
Figure 15:
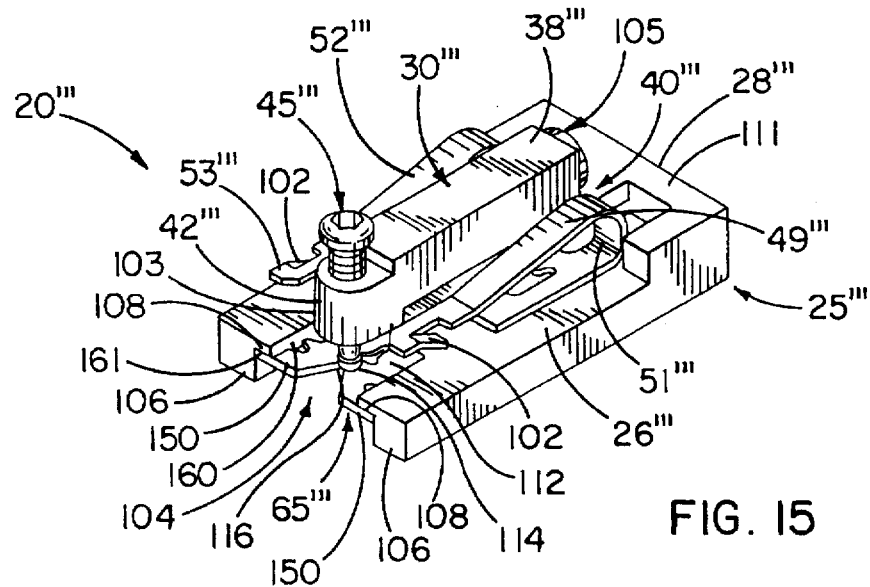
FIG. 15 is partially cut away perspective view of a fourth embodiment of the indicating device of the present invention.

As shown in FIGS. 3 and 9, an elongated tang 65 is formed integrally with and projects rearwardly from the plate 48 of the bracket 40 and includes a laterally enlarged pad 66 which underlies the lower end of the shank of the screw 45. When the device 20 is in an installed position in the platform 25, the pad 66 prevents the end of the metal screw from digging into and forming a depression in the bottom wall 26 of the platform.

The indicating device 20 is adapted to be installed simply by slipping the device forwardly onto the platform 25. As shown most clearly in FIG. 2, the side walls 27 of the platform are spaced laterally outboard from the bottom wall 26 and include lower edges 70 which are spaced above the bottom wall. When the device 20 is slid forwardly, laterally projecting ears 71 formed integrally with the forward end portion of the plate 48 move beneath the lower edges 70 of the side walls 27. Engagement of the ears 71 with the lower edges 70 prevents the forward end portion of the bracket 40 from moving upwardly relative to the platform 25.

Novel means are provided for preventing the rear end of the bracket 40 from shifting upwardly relative to the platform 25 and for preventing the bracket from shifting forwardly, rearwardly, upwardly and downwardly relative to the platform once the device 20 has been installed on the platform. Herein, these means are formed in part by a rearwardly projecting tongue 75 (FIG. 2) molded integrally with the rear end 76 of the bottom wall 26 of the platform 25. An upstanding ledge 77 is molded integrally with the rear end portion of the tongue and defines a forwardly facing shoulder which is spaced forwardly from the rear end of the tongue.

Coacting with the tongue 75 is a tab 80 which is bent downwardly from the rear end of the plate 48 of the bracket 40. An opening 81 is formed through the tab 80 and the adjacent end portion of the plate 48 to accommodate the tongue, the edges of the opening engaging the tongue to prevent upward and lateral shifting of the plate relative to the platform 25. The pad 66 of the tang 65 projects rearwardly through the opening 81.

As the indicating device 20 is slid forwardly along the platform 25, the tab 80 moves into telescoping relation with the tongue 75. As forward movement continues, the tang 65 and the pad 66 are cammed upwardly by the ledge 77 against the force of the cantilevered sections 52, which bear against the base 38 and through the screw 45 onto the pad 66. At about the same time that the tab 80 engages the rear end 76 of the platform 25, the pad 66 clears the ledge 77 and springs downwardly in front of the forwardly facing shoulder defined by the ledge. In the finally installed position of the device 20, the lower edge of the opening 81 in the tab 80 engages the lower side of the tongue 75 to prevent upward movement of the rear portion of the bracket 40, the forward side of the tab 80 engages the rear end 76 of the bottom wall 26 of the platform to prevent forward shifting of the bracket, and the rear edge of the pad 66 engages the forwardly facing shoulder of the ledge 77 to prevent rearward shifting of the bracket. If it is necessary to remove the device 20 from the platform 25, a blade-like tool (not shown) may be inserted through a hole 85 (FIG. 2) in the forward wall 28 of the platform and may be used to pry the pad 66 of the tang 65 upwardly out of engagement with the ledge 77 to permit rearward shifting of the device. A groove 86 in the bottom wall 26 accommodates the tool during the prying operation.

When the device 20 is installed on the platform 25, adjustment of the inclination of the vial 30 may be effected by turning the screw 45. If the screw is turned in a tightening direction, it bears downwardly against the pad 66 which, in turn, bears downwardly against the bottom wall 26 of the platform 25. This forces the rear end portion of the vial 30 and the integral base 38 to pivot upwardly about the fulcrum defined by the upper edge of the tab 62 and enables the air bubble 33 to shift from front-to-rear in the vial in order to bring the bubble to the zero position. During upward pivoting of the rear end portion of the vial, the cantilevered sections 52 of the spring legs 49 of the bracket 40 are resiliently loaded by virtue of the base 38 forcing upwardly against the free end portions 53 of the legs.

When the screw 45 is turned in a loosening direction, the resiliently loaded cantilevered sections 52 of the legs 49 cause the rear end portion of the vial 30 to pivot downwardly about the fulcrum 62. Thus, loosening of the screw causes rear-to-front movement of the bubble 33 for purposes of zeroing the bubble.

From the foregoing, it will be apparent that the present invention brings to the art a headlamp indicating device 20 in which the vial 30 and the integral base 38 may be slipped into assembled relation with the spring bracket 40 and in which the assembled device may be slipped into an installed position on the platform 25. Since the spring legs 49 are resiliently loaded by upward pivoting of the rear end of the base 38 and since the tongue 75 serves as the reaction point during such resilient loading, the top of the platform 25 may be virtually of any configuration. The top of the platform may, for example, be completely open as illustrated or, if desired, the top may be closed by a longitudinally slotted cover (not shown) whose only function is to protect major portions of the indicating device. If such a cover is employed, the top of the vial 30 is visible through the longitudinal slot in the cover, the use of the cover being made possible by virtue of the cantilevered sections 52 of the legs 49 slanting downwardly upon progressing forwardly so as to provide space for the cover.

A modified indicating device 20' for use with a modified platform 25" is shown in FIGS. 11–13 in which parts corresponding to those of the first embodiment are indicated by the same but primed reference numerals. The modified platform lacks upstanding side walls corresponding to the side walls 27 and its front wall 28' is formed with laterally extending slots 90 on opposite sides of the hole 85'.

The modified indicating device 20' lacks a tab or fulcrum corresponding to the tab 62 and also lacks ears corresponding to the ears 71. In place of the tab and ears, the device 20' includes a pair of laterally spaced tabs 92 molded integrally with and projecting forwardly from the base 38'. When the device 20' is assembled with the platform 25', the tabs 92 slip into the slots 90 and prevent upward bodily movement of the forward end of the device. To enable pivoting of the vial 30' during adjustment of the screw 45', laterally extending grooves 93 are formed between the tabs 92 and the adjacent ends of the base and define living hinges which permit upward and downward pivoting of the base relative to the tabs. Upon installation of the device 20', the ears 61' drop into engagement with forwardly facing shoulders 94 (FIG. 11) at the forward end of the bottom wall 26' of the platform 25'. When the screw is adjusted, the upper ends of the shoulders 94 serve as a fulcrum.

The indicating device 20" shown in FIG. 14 is similar to that of FIGS. 10–13 except that the device 20" includes a somewhat different retaining bracket 40". The cantilevered sections 52" of the legs 49" of the bracket 40" extend generally parallel to the upper side of the base 38" rather than sloping downwardly toward the base. The free end of each cantilevered section 52" is defined by a downwardly extending portion 95 and by a forwardly extending portion 96, the latter bearing resiliently downwardly against the upper side of the base 38". The bracket 40" has a higher vertical profile than the brackets 40 and 40' and may be used in applications where sufficient vertical space is available to accommodate the cantilevered sections 52".

FIGS. 15–19 illustrate a fourth embodiment of the indicating device 20'" for use with a modified platform 25'". The indicating device 20'" includes modified means for restricting both the movement of the base 38'" relative to the retaining bracket 40'" and the movement of the retaining bracket 40'" relative to the platform 25'".

In order to restrict the movement of the base 38''' relative to the retaining bracket 40''', the device 20''' includes a pair of laterally spaced catch tabs 102 formed on the free ends 53''' of the cantilevered sections 52''' of the laterally spaced legs 49'''. These elements restrict movement of the base 38''' relative to the retaining bracket 40''' when those elements are assembled in a subassembly, but before the "barb-set" operation which attaches the subassembly to a headlight housing. After the barb-is set, the cooperation between the adjusting screw 45''' in an aperture 114 in the bracket 40''' assumes the function of restricting movement of the base 38''' relative to the bracket 40'''.

Figure 16:
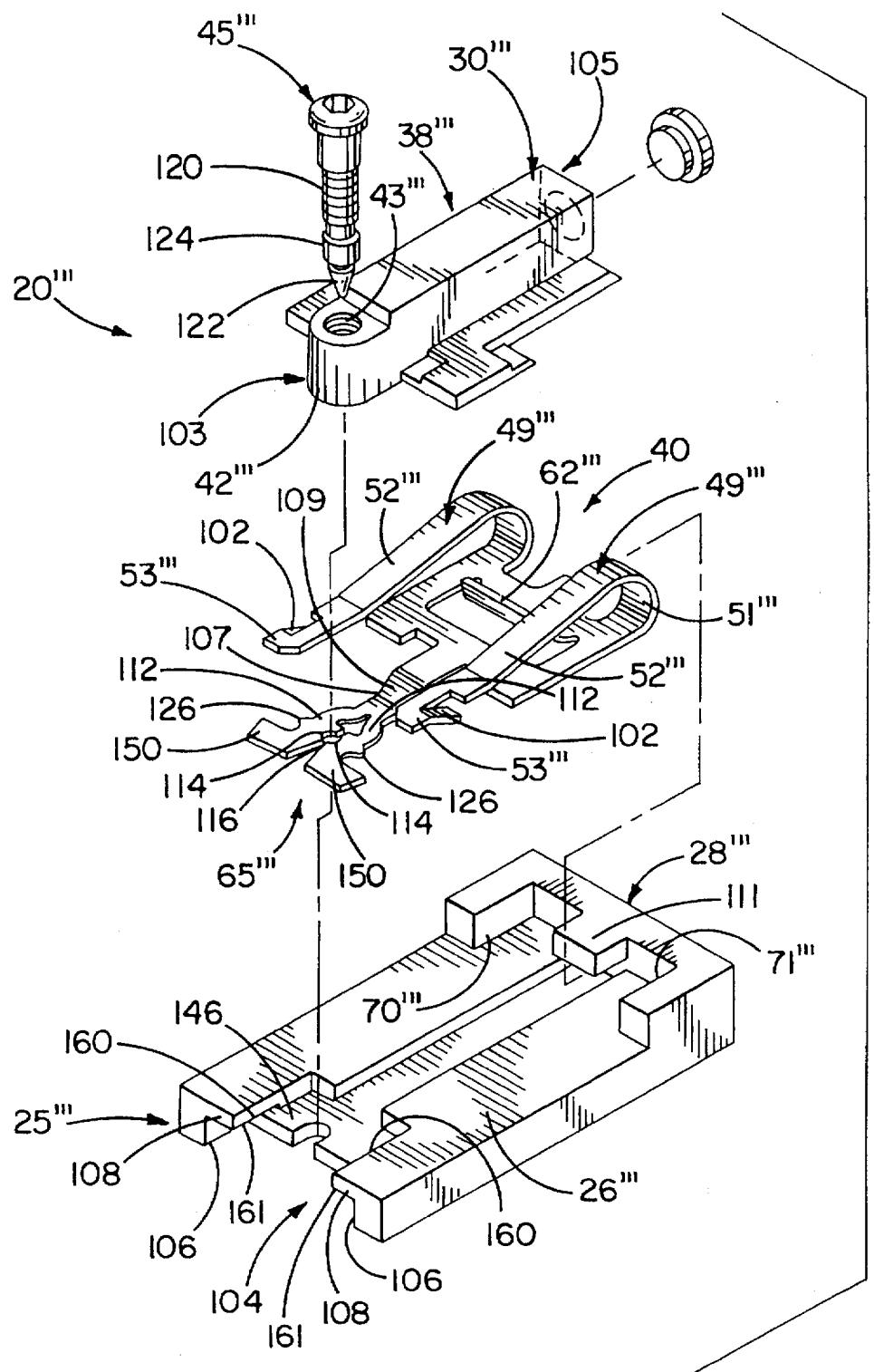
FIG. 16 is an exploded perspective view of the components of the fourth embodiment of the indicating device.

The catch tabs 102 are disposed between the portion of the free end that curves upwardly and the portion that bears on the upper side of the base 38''', as shown in FIG. 16. The catch tabs 102 project angularly downward from the free end 53''' of the cantilevered section 52''' towards the front of the base 38'''. During assembly, the bracket 40''' and base 38''' are joined, by sliding the base into the bracket. The angular projection of the catch tabs 102 permits the catch tabs 102 to slide over the upper side of the base 38'''. As best shown in FIG. 18, after the catch tabs 102 clear the base 38''', the cantilevered sections 52''' are biased resiliently downward until the free end 53''' rests on the upper side of the base 38''', such that the catch tabs 102 engage the rear end 103 of the base 38'''. The engagement of the catch tabs 102 with the rear end 103 of the base 38''' prevents the base 38''' from moving rearwardly with respect to the bracket 40'''. At about the same time that the catch tabs 102 engage the rear end 103 of the base 38''', the front end 105 of the base 38''' reaches and bears against the upwardly extending section 51''' of the two laterally spaced legs 49''', thereby preventing the forward movement of the base 38''' relative to the bracket 40'''. In this condition, the base 38''' and bracket 40''' are securely connected to form a subassembly which will reliably remain assembled. The subassembly can then be fixed to a headlight housing (described generically as platform 25''' herein) in a manner which will be described below.

In order to restrict movement of the bracket 40''' relative to the platform 25''', and also, in part, to restrict movement of the base 38''' relative to the retaining bracket 40''', the device 20''' includes a modified tang 65''' and a modified calibrating screw 45''' for securing the bracket 40''' to the platform 25''', as best shown in FIG. 16. In addition, as also seen in FIG. 16, the platform 25''' includes a recess 104 formed in the rear end of the bottom wall 26''' of the platform 25'''. The recess 104 is defined by a pair of opposing generally parallel side walls 106. Projecting generally perpendicularly from each wall 106 is a ledge 108 which, as will be described in greater detail below, is adapted to cooperate with flags 150 on the bracket 40''' to prevent the bracket with attached vial from lifting from the base. The ledge 108 also presents vertical walls 160 rising from the ledge. As will become more apparent, the walls 160 are the elements into which the barbs on the bracket set to fix the bracket to the platform. In addition, the walls 160 are disposed to create a thin cavity 161 between the lower surface of the ledge 108 and a flat surface 146 of the platform. The cavity 161 is adapted to receive the flags after a barb-set operation, and restrain the bracket in the vertical direction.

As best shown in FIG. 18, the tang 65''' has a first section 107 which angles downward so that the lower portion of the tang can rest on the flat ledge 148 and a second horizontal section extends outwardly from the first section. As shown in FIG. 16, the tang 65''' also has a pair of laterally spaced and cantilevered fingers 112 formed integrally with and projecting rearwardly from the end 109 of the tang 65''' and capable of flexing laterally outwardly relative to the tang 65'''. Opposing semicircular notches 114 are formed in the inner edge of each of the fingers 112 so that the two laterally spaced notches 114 approximately form a hole 116 substantially in the shape of a circle that is concentric with the hole 43''' in the nose 42''' of the base that receives the calibrating screw 45'''. FIG. 18 shows that the notches 114 are tapered from the top to the bottom to provide a taper which cooperates with the adjusting screw in a manner which will be described below. As best shown in FIGS. 16 and 18, the shank of the calibrating screw 45''' includes a threaded section 120 and a wedge section 122 that are separated by an annular groove 124. The threaded section 120 is adapted for insertion into the hole 43''' formed vertically through the nose 42''' of the base 38'''. The wedge section 122 is formed in the end of the shank and projects into the aperture 116 formed by the two semicircular notches 114. The screw 45 is intended to be forced through the aperture 116 in a "barb-set" operation which causes the assembly to be snapped into its operative condition. A sharp tap on the screw causes the tapered portion 122 to cam the legs 112 outwardly until the slot 124 in the screw engages the tapered aperture 116 in the tang. The wedge section 122 engages the fingers 112 and cams the fingers 112 outwardly into engagement with the side walls 160 of the recess 104 formed in the bottom wall 26''' of the platform 25''' (FIG. 16), the barbs 126 engage opposing walls 160, thereby preventing the bracket 40''' from shifting rearward relative to the platform 25'''. Enlarged flags 150 carried on the legs 112 are also cammed outwardly, such that the ends of the flags 150 underlie the ledges 108 and fit within the cavities 161. Thus, the bracket 40 (with attached vial) is restrained in the fore and aft movement by virtue of the barbs engaging the side walls 160, whereas up and down movement is restrained by virtue of the flags 150 underlying the shelves 108. The "barb-set" operation can be best understood with reference to FIG. 19. The solid line showing of FIG. 19 illustrates the notches 114 forming the aperture 116 in the relaxed condition before a barb-set operation. It will be seen that the barbs 126 are out of contact with the walls 160, and that the flags 150 are free of the cavities 161 underlying the ledges 108. In that condition, the subassembly of base and bracket are slid into the platform, typically a headlight assembly. After the subassembly is slid to its home position, a barb-set operation is performed. In the illustrated embodiment, a barb-set operation is performed by a fixture which applies a sharp downward tap to the head of the adjusting screw 45'''. This sharp tap drives the wedge section of the screw into the aperture 116, camming the fingers 112 outwardly until the notch 124 reaches and falls within the aperture 116. That is the condition illustrated in dashed lines in FIG. 19. In the dashed line condition, it will be seen that the barbs 126 dig into the walls 160, and that the flags 150 sit in cavities 161 underlying ledge 108. The subassembly is thus secured into the platform, and the adjusting screw 45''' can then be adjusted to set the level. It is noteworthy that the position of the base containing the level is then secured to the platform by virtue of the engagement of the notch 124 of the adjusting screw with the aperture 116. The bracket itself is retrained from movement in the platform by virtue of the interengaged flags and barbs, but the base itself is restrained both fore and aft, side to side, and vertically by virtue of the engagement of the adjusting screw notch 124 in the aperture 116.

As best shown in FIG. 18, once the wedge 122 moves downwardly past the notches 116, the fingers 114 engage the annular groove 124 thereby preventing any further upward or downward movement of the screw 45''' relative to the bracket 40'''. The spring force of the bracket 40' serves to load the adjusting screw 45''' upwardly, so that the bottom of the notch 124 engages the tapered portion of the aperture 114. In this condition, the inclination of the vial 30''' can be adjusted by turning of the screw 45'''. For example, if the screw 45''' is turned further into the nose 42''', the annular groove 124 bears downwardly against the fingers 114 which, in turn bear downwardly against the flat surface 146 formed in the bottom of platform 25'''. This forces the rear end portion 103 of the vial 30''' and the base 38''' to pivot upwardly about the fulcrum defined by the upper edge of the tab 62''' of bracket 40'''. Similarly, if the screw 45''' is turned out of the nose 42''', the annular groove 124 prevents movement of the screw relative to the bracket 40''' and the resiliently loaded cantilevered sections 52''' of the legs 49''' cause the rear end portion of the vial 30''' to pivot downwardly about the upper edge of the tab 62'''.

Figure 17:
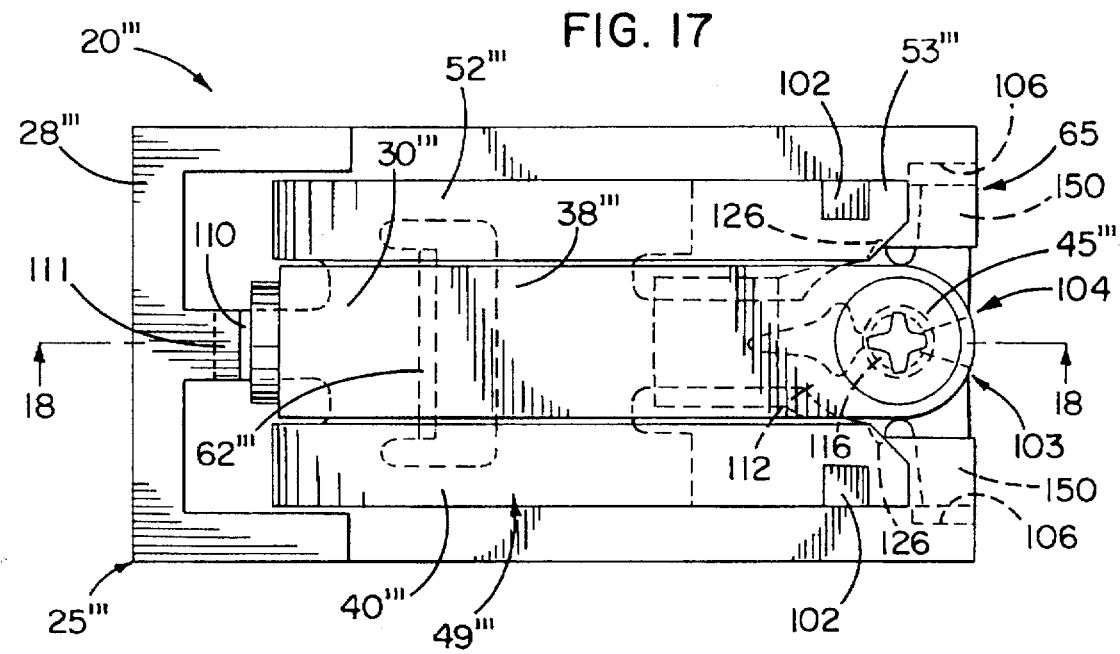
FIG. 17 is an enlarged top plan view of the fourth embodiment of the indicating device.

In place of the ears, the device 20''' includes a tab 110 integral with and projecting forwardly from the bracket 40'''. As best shown in FIGS. 17–18, when the device 20''' is assembled with the platform 25''' the tab 110 slips under a tab 111 formed in the forward wall 28''' of the platform 25''' preventing upward bodily movement of the forward end of the bracket 40''' relative to the platform 25'''.

An alternative embodiment of the screw 145 is shown in FIG. 20 as including a second threaded portion 128 separated from the first threaded portion 130 by an annular groove 132 instead of the wedge section 122 as shown in 45'''. In the embodiment using wedge section 122, a sharp linear force is used to perform a barb-set operation. In the present embodiment, a torque is used to perform a barb-set operation. In order to accomplish that, the present embodiment includes a second threaded portion 128 which is, for example, a thread forming type B thread, as used in sheet metal. This tapered thread replaces the wedge 122 in the prior embodiment. The starting portion of the thread 128 engages the aperture 116, and is advanced to the root diameter which begins to spread the notches 114. The fingers 112 thus are cammed outwardly. Continued rotation advances the increasing diameter threads into the aperture 116, camming the fingers 112 further apart until they spread sufficiently to capture the annular groove 132 in the aperture 114. The arrangement of barbs and notches is generally like that shown in FIG. 19. The screw 145 is also captive just as in the previous embodiment.

In summary, the barb can be set in a number of ways, including the linear tap using a wedge as illustrated in the previous embodiment or a torque-set as in the FIG. 20 embodiment.

What is claimed is:

1. An indicating device for a vehicle headlamp, said device comprising a base having first and second ends, having first and second laterally spaced side edge portions and having upper and lower sides, a transparent vial having a body portion projecting upwardly from the upper side of said base between the side edge portions thereof, said vial containing liquid having a gas bubble therein, means associated with said vial and coacting with said bubble to indicate when said vial is horizontal, a retaining bracket made of a single piece of a resilient material, connecting means on said base and said bracket and interfitting with one another to hold said base and said bracket in assembled relation, said bracket having a plate underlying said base and having a pair of laterally spaced legs formed integrally with said plate, said legs having first generally horizontal sections projecting in one direction outwardly and away from said first end of said base, having second sections integral with and extending upwardly from said first sections in opposing relation with said first end of said base, and having cantilevered sections integral with said second sections and extending generally toward said second end of said base and generally opposite of said first sections, said cantilevered sections being located on opposite sides of said vial in straddling relation with said vial and having at least portions spaced above the upper side of said base in overlying relation therewith, said cantilevered sections having free ends bearing resiliently downwardly against the upper side of said base adjacent the second end of second base and said free ends of said cantilevered sections resisting upward movement of the second end of said base relative to said bracket, wherein said connecting means including a catch tab disposed on the free end of each of the cantilevered sections and extending generally towards said first end of said base for engaging said second end of said base and preventing said bracket from moving toward said second end of said base.

2. An indicating device as defined in claim 1 wherein said connecting means includes said first end of said base engaging said second sections of said legs for preventing said bracket from moving toward said second end of said base.

3. An indicating device for a vehicle headlamp, said device comprising a base having first and second ends, having first and second laterally spaced side edge portions and having upper and lower sides, a transparent vial having a body portion projecting upwardly from the upper side of said base between the side edge portions thereof, said vial containing liquid having a gas bubble therein, means associated with said vial and coacting with said bubble to indicate when said vial is horizontal, a retaining bracket made of a single piece of resilient material, connecting means on said base and said bracket and interfitting with one another to hold said base and said bracket in assembled relation, said bracket having a plate underlying said base and having a pair of laterally spaced legs formed integrally with said plate, said legs having first generally horizontal sections projecting in one direction outwardly and away from said first end of said base, having second sections integral with and extending upwardly from said first sections in opposing relation with said first end of said base, and having cantilevered sections integral with said second sections and extending generally toward said second end of said base and generally opposite of said first sections, said cantilevered sections being located on opposite sides of said vial in straddling relation with said vial and having at least portions spaced above the upper side of said base in overlying relation therewith, said cantilevered sections having free ends bearing resiliently downwardly against the upper side of said base adjacent the second end of second base and said free ends of said cantilevered sections resisting upward movement of the second end of said base relative to said bracket, and a tang extending from said plate including a first downwardly angling section, a second generally horizontal section extending from the said first section, a pair of opposing fingers projecting from said second section, and flags projecting from the fingers.

4. An indicating device as defined in claim 3 in combination with a vehicle headlamp component, said component comprising a platform having a bottom wall, laterally spaced side walls and first and second ends, and a recess formed in the second end of said bottom wall defined by a pair of opposing side walls and a ledge perpendicularly projecting from each side wall, said recess cooperating with said flag for preventing vertical movement between the bracket and platform.

5. An indicating device as defined in claim 4 wherein the second end of the base has a substantially vertical threaded hole for receiving said screw, an adjusting screw having a lower end engageable with said fingers of said tang, a fulcrum located between said plate and said base and supporting said base for pivotable movement relative to said plate in response to rotation of said screw.

6. An indicating device as defined in claim 5 wherein said screw includes an annular groove separating a first threaded section and a second generally wedge-shaped section, whereby said second section of said screw engages a pair of opposing notches in said fingers for camming said fingers of said tang into engagement with said side walls of said recess in response to insertion of said screw and preventing movement between said bracket and said platform.

7. An indicating device as defined in claim 5 wherein said screw includes an annular groove separating a first threaded section and a second threaded section having a smaller diameter than said first section, whereby said second section of said engages complementary threads formed in a pair of opposing notches in said fingers for moving said fingers into engagement with said side walls of said recess in response to insertion of said screw and preventing movement between said bracket and said platform.

8. An indicating device as defined in claim 4 including a wall projecting upwardly form said platform adjacent the first end thereof, a slot formed in said wall, and a tab formed integrally with said bracket for projecting into said slot and preventing upward bodily movement of said bracket relative to said first end of said platform.

* * * * *